(12) United States Patent
Yu et al.

(10) Patent No.: US 10,291,927 B2
(45) Date of Patent: May 14, 2019

(54) MOTION VECTOR ESTIMATION METHOD AND MOTION VECTOR ESTIMATION APPARATUS

(71) Applicant: SAMSUNG ELECTRONICS CO., LTD., Suwon-si, Gyeonggi-do (KR)

(72) Inventors: Yong-hoon Yu, Yongin-si (KR); Hyung-jun Lim, Seoul (KR); Seong-hoon Choi, Yongin-si (KR); Shin-haeng Kim, Suwon-si (KR); Tae-gyoung Ahn, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 193 days.

(21) Appl. No.: 15/181,765

(22) Filed: Jun. 14, 2016

(65) Prior Publication Data

US 2017/0118483 A1 Apr. 27, 2017

(30) Foreign Application Priority Data

Oct. 21, 2015 (KR) .......................... 10-2015-0146375

(51) Int. Cl.
*H04N 19/513* (2014.01)
*H04N 19/56* (2014.01)
(52) U.S. Cl.
CPC ........... *H04N 19/513* (2014.11); *H04N 19/56* (2014.11)

(58) Field of Classification Search
CPC .............................. H04N 19/513; H04N 19/56
See application file for complete search history.

(56) References Cited

U.S. PATENT DOCUMENTS

| | | | | |
|---|---|---|---|---|
| 2002/0172287 A1* | 11/2002 | Kim | ....................... | H04N 5/145 375/240.16 |
| 2012/0163462 A1* | 6/2012 | Park | ....................... | H04N 19/52 375/240.16 |
| 2014/0185882 A1* | 7/2014 | Masuura | ............ | H04N 5/23254 382/107 |

* cited by examiner

*Primary Examiner* — Jonathan R Messmore
(74) *Attorney, Agent, or Firm* — Nixon & Vanderhye P.C.

(57) ABSTRACT

A motion vector estimation method of a motion vector estimation apparatus are provided. The motion vector estimation method of the motion vector estimation apparatus includes: determining a motion vector of a current block by setting, in another frame, a local search area for searching a plurality of reference pixel blocks corresponding to the current block which is one of pixel blocks in a single frame; and finally determining one of the determined motion vector and a previous motion vector referred to in order to determine the local search area as a motion vector of the current block, based on sum of absolution difference (SAD) values of the reference pixel blocks included in the local search area.

7 Claims, 8 Drawing Sheets

MOTION VECTOR ESTIMATION METHOD AND MOTION VECTOR ESTIMATION APPARATUS

CROSS-REFERENCE TO RELATED APPLICATIONS

This application is based on and claims priority under 35 U.S.C. § 119 to Korean Patent Application No. 10-2015-0146375, filed on Oct. 21, 2015, in the Korean Intellectual Property Office, the disclosure of which is incorporated by reference herein in its entirety.

BACKGROUND

Field

Apparatuses and methods consistent with example embodiments relate to a motion vector estimation method and a motion vector estimation apparatus, and for example, to a motion vector estimation method and a motion vector estimation apparatus for compressing an image or converting a frame rate.

Description of Related Art

A moving image which is acquired through a photographing apparatus such as a camera, a camcorder, etc. includes various objects, and the objects move in various directions. If it is possible to estimate the motions of the objects, video coding or frame rate up conversion could be performed more effectively.

To estimate the motions of the objects included in the image frame, various related-art methods such as full search, 3-step search, recursive search, hierarchical search, etc. are used, and a method of searching an area which has a smallest Sum of Absolution Difference (SAD) value between a current block and a reference block is frequently used.

However, the related-art method is useful for finding data having a smallest SAD value between a current block and a reference block, but may be ineffective in finding a unique motion of an object. For example, it is difficult to find a unique motion vector of a current block in a repeated pattern portion, a flat background portion, and a portion where similar objects overlap each other, which are included in an image.

In particular, when a frame rate is up-converted, finding a unique motion vector is more favorable to image quality than finding a block having a smallest SAD value. However, the related-art SAD-based motion vector estimation method cannot find a unique motion vector.

SUMMARY

One or more example embodiments may address the above disadvantages and other disadvantages not described above.

One or more example embodiments provide a motion vector estimation method and a motion vector estimation apparatus, which can address a problem of deterioration of image quality which is caused by not finding a unique motion vector in SAD-based motion estimation.

According to an aspect of an example embodiment, a motion vector estimation method is provided including: determining a motion vector of a current block by setting, in another frame, a local search area for searching a plurality of reference pixel blocks corresponding to the current block which is one of pixel blocks in a single frame; and finally determining one of the determined motion vector and a previous motion vector which is referred to in order to determine the local search area as a motion vector of the current block, based on SAD values of the reference pixel blocks included in the local search area.

The determining may include: determining the local search area by referring to neighboring pixel blocks of the current block in the single frame or neighboring pixel blocks of a pixel block corresponding to the current block in a previous frame; determining SAD values between the plurality of reference pixel blocks included in the local search area and the current block; determining a minimum SAD value from among the determined SAD values; and determining the motion vector of the current block by comparing a pixel block having the determined minimum SAD value and the current block.

The determining may include: determining SAD difference values for the plurality of reference pixel blocks by comparing the determined SAD values and the determined minimum SAD value; counting a number of reference pixel blocks having the SAD difference values falling within a predetermined allowable range; and, in response to the counted number being greater than or equal to a threshold value, finally determining the previous motion vector which is referred to in order to determine the local search area as the motion vector of the current block, and, in response to the counted number being less than the threshold value, finally determining the determined motion vector as the motion vector of the current block.

The determining may include: determining SAD difference values for the plurality of reference pixel blocks by comparing the determined SAD values and the determined minimum SAD value; determining a sum of the SAD difference values falling within a predetermined allowable range; and, in response to the sum being greater than or equal to a threshold value, finally determining the previous motion vector which is referred to in order to determine the local search area as the motion vector of the current block, and, in response to the sum being less than the threshold value, finally determining the determined motion vector as the motion vector of the current block.

At least one of the allowable range and the threshold value may be set variably according to a standard deviation of pixel values in the current block.

According to an aspect of another example embodiment, a motion vector estimation apparatus is provided, including: a storage configured to store a plurality of frames for detecting a motion vector; and a processor configured to determine a motion vector of a pixel block in each frame by performing a local search with respect to the plurality of frames, wherein the processor is configured to: determine a motion vector of a current block by setting, in another frame, a local search area for searching a pixel block corresponding to the current block in a single frame; and to determine one of the determined motion vector and a previous motion vector which is referred to in order to determine the local search area as a motion vector of the current block, based on SAD values of reference pixel blocks included in the local search area.

The processor may be configured to: determine the local search area by referring to neighboring pixel blocks of the current block in the single frame or neighboring pixel blocks of a pixel block corresponding to the current block in a previous frame; determine SAD values between the plurality of reference pixel blocks included in the local search area and the current block; determine a minimum SAD value from among the determined SAD values; and determine the motion vector of the current block by comparing a pixel block having the determined minimum SAD value and the current block.

The processor may be configured to: determine SAD difference values for the plurality of reference pixel blocks by comparing the determined SAD values and the determined minimum SAD value, and count a number of reference pixel blocks having the SAD difference values falling within a predetermined allowable range; and in response to the counted number being greater than or equal to a threshold value, finally determine the previous motion vector which is referred to in order to determine the local search area as the motion vector of the current block, and, in response to the counted number being less than the threshold value, finally determine the determined motion vector as the motion vector of the current block.

The processor may be configured to: determine SAD difference values for the plurality of reference pixel blocks by comparing the determined SAD values and the determined minimum SAD value, and determine a sum of the SAD difference values falling within a predetermined allowable range; and, in response to the sum being greater than or equal to a threshold value, finally determine the previous motion vector which is referred to in order to determine the local search area as the motion vector of the current block, and, in response to the sum being less than the threshold value, finally determine the determined motion vector as the motion vector of the current block.

The processor may be configured to set at least one of the allowable range and the threshold value variably according to a standard deviation of pixel values in the current block.

According to an aspect of another example embodiment, a computer-readable recording medium is provided which includes a program for executing a motion vector estimation method, the motion vector estimation method including: determining a motion vector of a current block by setting, in another frame, a local search area for searching a plurality of reference pixel blocks corresponding to the current block which is one of pixel blocks in a single frame; and finally determining one of the determined motion vector and a previous motion vector which is referred to in order to determine the local search area as a motion vector of the current block, based on SAD values of the reference pixel blocks included in the local search area.

According to various example embodiments described above, deterioration of image quality which is caused by not finding a unique motion vector in SAD-based motion estimation can be reduced and/or prevented.

Additional and/or other aspects and advantages of the disclosure will be set forth in part in the detailed description which follows and, in part, will be apparent from the description.

BRIEF DESCRIPTION OF THE DRAWINGS

The above and/or other aspects of the present disclosure will be more apparent from the following detailed description, taken in conjunction with the accompanying drawings, in which like reference numerals refer to like elements, and wherein.

DETAILED DESCRIPTION

In the following description, detailed descriptions of well-known functions or configurations may be omitted if they would unnecessarily obscure the subject matters of the present disclosure. In addition, the term "unit" used in relation to the elements described in the following description may be used only for easy preparation of the description, or interchangeably used with other terms, and does not have its own distinct meaning or role.

Figure 1:
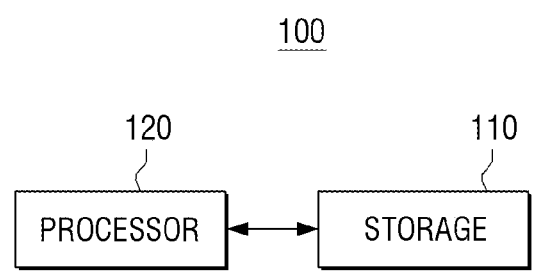
FIG. 1 is a block diagram illustrating an example configuration of a motion vector estimation apparatus according to an example embodiment.

FIG. 1 is a block diagram illustrating an example motion vector estimation apparatus according to an example embodiment. Referring to FIG. 1, the motion vector estimation apparatus 100 includes a storage 110 and a processor 120.

The motion vector refers to information indicating directionality of an object included in an image frame in a moving image, and includes information regarding a direction and a degree of movement of an object. Therefore, the motion vector may be used to code (compress) moving image data or up-convert a frame rate.

For example, an amount of data of a moving image which is obtained through a photographing apparatus such as a camera, a camcorder, etc. can be reduced by coding the moving image using a motion vector. In addition, the motion vector may be used when a display apparatus having a high frame rate up-converts a frame rate of a source image having a low frame rate, and displays the image.

Therefore, the motion vector estimation apparatus 100 may be a photographing apparatus including a camera, a camcorder, etc. or a display apparatus such as a TV, a mobile phone, a monitor, etc., but is not limited to these.

The storage 110 stores a plurality of frames for detecting a motion vector. In this case, the plurality of frames may be image frames constituting a moving image. Herein, the moving image may be moving image data which is acquired from various sources such as a broadcasting station, an external apparatus (for example, a DVD player, a Blu-ray disk player, etc.), etc., but is not limited to this. For example, the moving image may be moving image data which is pre-stored in the motion vector estimation apparatus 100.

The moving image data which is acquired from the various sources may be processed by the processor 120 and stored in the storage 110 on an image frame basis. In this case, the storage 110 may include a buffer memory, but is not limited to this and may further include various Random Access Memories (RAMs), a flash memory, a Hard Disk Drive (HDD), a Solid State Drive (SSD), etc.

The processor 120 determines motion vectors of pixel blocks in each of the frames by performing a local search with respect to the plurality of frames. Hereinafter, a process of determining a motion vector of a current block included in a single frame will be explained. However, it is apparent that the processor 120 divides a single frame into a plurality of pixel blocks (macro blocks) and determines motion vectors for all of the pixel blocks in the corresponding frame by performing the same process with respect to the pixel blocks in sequence. In addition, it is apparent that the processor 120 determines a motion vector for every pixel block in each frame by performing the same process with respect to the plurality of frames stored in the storage 110.

The processor 120 may determine the motion vector of the current block by setting, in another frame, a local search area for searching a pixel block corresponding to the current block in one of the plurality of frames. That is, the processor 120 may determine the motion vector of the current block by searching the pixel block corresponding to the current block included in one frame in the local search area set in another frame. In this case, another frame may be the next frame of one frame in view of a time sequence, but is not limited to this. According to another example embodiment, another frame may be a previous frame.

Specifically, the processor 120 may determine the local search area by referring to neighboring pixel blocks of the current block in one frame or neighboring pixel blocks of the pixel block corresponding to the current block in the previous frame of one frame.

That is, the processor 120 may determine the local search area to be set in another frame by referring to motion vectors of neighboring pixel blocks of the current block in the frame including the current block, or referring to motion vectors of neighboring pixel blocks of a pixel block corresponding to the current block in the previous frame of the frame including the current block, and may set the determined local search area in another frame.

For example, the processor 120 may divide a single frame into 256 macro blocks from a pixel block (0, 0) to a pixel block (15, 15). To determine a motion vector of a current block (5, 5) from among the pixel blocks, the processor 120 may determine a local search area using motion vectors of neighboring pixel blocks of the current block (5, 5).

Specifically, the processor 120 may determine an optimal motion vector from among motion vectors of a pixel block (4, 4), a pixel block (4, 5), a pixel block (4, 6), a pixel block (5, 4), a pixel block (5, 6), a pixel block (6, 4), a pixel block (6, 5), and a pixel block (6, 6) which surround the current block (5, 5). For example, the processor 120 may determine SADs between the current block (5, 5) and the eight neighboring pixel blocks surrounding the current block (5, 5), and determine a motion vector of a pixel block having a minimum SAD value from among the determined SAD values as an optimal motion vector. However, this should not be considered as limiting.

Accordingly, the processor 120 may determine the local search area to be set in another frame using the determined optimal motion vector. For example, in response to the optimal motion vector being the motion vector (0, 5) of the pixel block (6, 6), the processor 120 may set a local search area which is formed with reference to the block (5, 10) in another frame by applying the optimal motion vector (0, 5) to the location of the current block (5, 5).

In this case, the processor 120 may set the local search area to be larger than the current block. For example, in response to the size of the current block being 1*1, the local search area may be set to have a size of 8*8, 16*16, 32*32, etc., but is not limited to these. In addition, since the motion vectors are calculated or determined in sequence in one frame in the above-described example, the motion vectors of the pixel blocks (5, 6), (6, 4), (6, 5), and (6, 6) from among the neighboring pixel blocks for determining the local search area are determined after the motion vector of the current block (5, 5) is determined. Accordingly, the motion vectors of the pixel blocks which are determined after the motion vector of the current block is determined may be determined with reference to the motion vectors of the corresponding pixel blocks in the previous frame rather than in the frame including the current block.

In response to the local search area being determined in this way, the processor 120 may determine SAD values between a plurality of reference pixel blocks included in the determined local search area and the current block, determine a minimum SAD value from among the determined SAD values, and determine a motion vector of the current block by comparing the pixel block having the minimum SAD value and the current block.

For example, the processor 120 may determine the SAD values by comparing the pixel blocks having the same size as that of the current block in the local search area set in another frame, and the current block, while moving on a pixel line basis. That is, the processor 120 may determine the SAD value between the pixel block and the current block at every location of the pixel blocks. In this case, the pixel block which moves in the local search area becomes one reference pixel block every time the pixel block moves on the pixel line basis. However, the example of the processor 120 determining the SAD value for each of the plurality of reference pixel blocks included in the local search area is not limited to this.

In response to the SAD values for the plurality of reference pixel blocks included in the local search area being determined in this way, the processor 120 may determine a minimum SAD value and determine the motion vector of the current block by comparing the location of the pixel block having the minimum SAD value in the local search area and the location of the current block.

The processor 120 may finally determine, as the motion vector of the current block, one of the determined motion vector of the current block and the previous motion vector which was referred to in order to determine the local search area, based on the SAD values of the reference pixel blocks included in the local search area. Herein, the previous motion vector which was referred to in order to determine the local search area may be the optimal motion vector which was determined from among the motion vectors of the neighboring pixel blocks of the current block which were referred to in order to determine the local search area, and the motion vectors of the neighboring pixel blocks of the pixel block corresponding to the current block in the previous frame. However, this should not be considered as limiting.

Specifically, the processor 120 may determine SAD difference values for the plurality of reference pixel blocks by comparing the SAD values of the plurality of reference pixel blocks included in the local search area and the minimum SAD value determined as described above, and count the number of reference pixel blocks having the SAD difference values falling within a predetermined allowable range. In response to the counted number being greater than or equal to a threshold value, the processor 120 may finally determine the previous motion vector which was referred to in order to determine the local search area as the motion vector of the current block, and, in response to the counted number being less than the threshold value, may finally determine the motion vector of the current black determined as described above as the motion vector of the current block.

In addition, the processor 120 may determine SAD difference values for the plurality of reference pixel blocks by comparing the SAD values of the plurality of reference pixel blocks included in the local search area and the minimum SAD value determined as described above, and may determine a sum of the SAD difference values falling within a predetermined allowable range. In response to the sum being greater than or equal to a threshold value, the processor 120 may finally determine the previous motion vector which was referred to in order to determine the local search area as the motion vector of the current block, and, in response to the sum being less than the threshold value, may finally determine the motion vector of the current black determined as described above as the motion vector of the current block.

In this case, the processor 120 may set at least one of the allowable range and the threshold value variably according to a standard deviation of the pixel values of the current block. Specifically, since the standard deviation of the pixel values of the current block indicates the complexity of the pixel values of the current block, the processor 120 may determine the standard deviation of the pixel values of the current block and set the allowable range or the threshold value variably according to the determined standard deviation. For example, as the determined standard deviation is higher, the processor 120 may set the allowable range or threshold value to be higher, and, as the standard deviation is lower, the processor 120 may set the allowable range or the threshold value to be lower.

According to various example embodiments described above, deterioration of image quality which is caused by not finding a unique motion vector in SAD-based motion estimation can be prevented.

Figure 2:
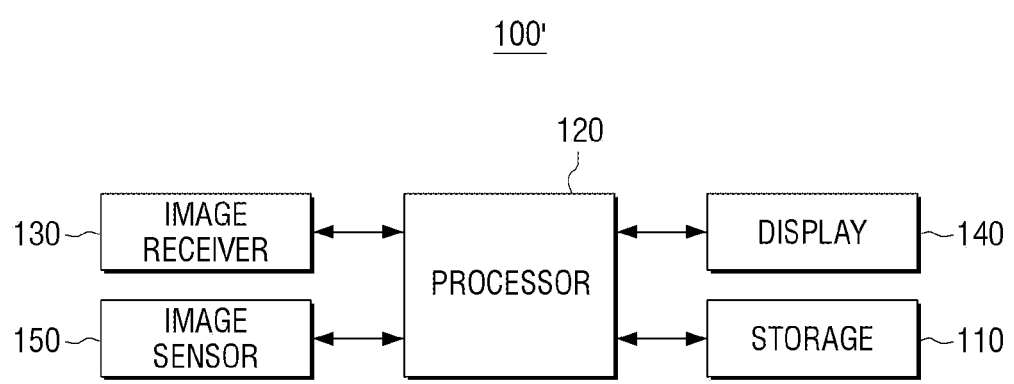
FIG. 2 is a block diagram illustrating an exampled configuration of the motion vector estimation apparatus according to an example embodiment.

FIG. 2 is a block diagram illustrating an example configuration of the motion vector estimation apparatus in more detail according to an example embodiment. Referring to FIG. 2, the motion vector estimation apparatus 100' includes a storage 110, a processor 120, an image receiver 130, a display 140, and an image sensor 150. In explaining FIG. 2, the elements which have been described with reference to FIG. 1 will not be explained.

The image receiver 130 receives image data through various sources. For example, the image receiver 130 may receive broadcasting data from an external broadcasting station and receive image data from an external apparatus (for example, a DVD device). In this case, the image data acquired from various sources may be moving image data, but is not limited to this.

The display 140 displays various images. Specifically, the display 140 may display image data received through the image receiver 130 and image data stored in the storage 110, for example, image data which is acquired through the image sensor 150 and stored in the storage 110, under the control of the processor 120. To achieve this, the display 140 may be implemented by using a Liquid Crystal Display (LCD) panel, an Organic Light Emitting Diode (OLED), etc. However, this should not be considered as limiting.

The image sensor 150 may detect incident light using at least one image pickup device and convert the detected light into an electric signal. In this case, the image pickup device may be a Charge Coupled Device (CCD) and a Complementary Metal Oxide Semiconductor (CMOS), but is not limited to these. In particular, the motion vector estimation apparatus 100' may photograph a moving image regarding a subject through the image sensor 150.

The processor 120 controls the overall operation of the motion vector estimation apparatus 100'. In particular, the processor 120 may process various image data received through the image receiver 130 and store the image data in the storage 110 in the frame basis.

In addition, in response to a frame rate of received image data being lower than a frame rate of an image outputted from the motion vector estimation apparatus 100', the processor 120 may up-convert the frame rate. For example, in response to the image data received through the image receiver 130 having a frame rate of 60 Hz, and the motion vector estimation apparatus 100' outputting an image at 120 Hz, the processor 120 may estimate a motion vector for each of the images frames of the received image data, generate an image frame, insert the generated image frame between the frames of the received image data, and output the received image data at 120 Hz.

Specifically, in order to determine a motion vector of a current block in one frame from among a plurality of image frames constituting image data, the processor 120 may determine a local search area by referring to neighboring pixel blocks of the current block or neighboring pixel blocks of a pixel block corresponding to the current block in a previous frame, and set the local search area in the next frame of the one frame.

For example, the processor 120 may determine SAD values between the above-described neighboring pixel blocks and the current block, and determine a motion vector of a pixel block having the minimum SAD value as an optimal motion vector. Accordingly, the processor 120 may determine the local search area using the optimal motion vector.

As explained above with reference to FIG. 1, the current frame including the current block may be divided into 256 pixel blocks from a pixel block (0, 0) to a pixel block (15, 15). In response to the current block being the pixel block (5, 5), the processor 120 may determine SAD values between the current block and eight neighboring pixel blocks of the current block, and determine a local search area by referring to a motion vector of a neighboring pixel block having the minimum SAD value from among the determined SAD values.

In response to the pixel block (6, 6) from among the eight neighboring pixel blocks having the minimum SAD value, the processor 120 may determine the motion vector (0, 5) of the pixel block (6, 6) from among the motion vectors of the eight neighboring pixel blocks of the current block as the optimal motion vector, and set a local search area which is formed with reference to the block (5, 10) in the next frame by applying the optimal motion vector to the current block (5, 5).

In response to the local search area being set in another frame (for example, the next frame) as described above, the processor 120 may determine SAD values between a plurality of reference pixel blocks included in the local search area and the current block, and may determine a minimum SAD value from among the determined SAD values. Accordingly, the processor 120 may determine a motion vector of the current block by comparing the reference pixel value having the minimum SAD value and the current pixel block.

In the above-described example, in response to the pixel block of a location (7, 10) being determined to have the minimum SAD value as a result of performing the local search, the processor 120 may determine (2, 5) as the motion vector of the current block by comparing the pixel block (5, 5), which is the current block, and the location of the reference pixel block (7, 10) having the minimum SAD value.

In response to the motion vector of the current block being determined as described above, the processor 120 may finally determine one of the determined motion vector of the current block and a previous motion vector which was referred to in order to determine the local search area as the motion vector of the current block, based on the SAD values of the reference pixel blocks included in the local search area.

Specifically, the processor 120 may determine SAD difference values for the plurality of reference pixel blocks by comparing the SAD values between the plurality of reference pixel blocks included in the local search area and the current block, and the minimum SAD value. Accordingly, the processor 120 may count the number of reference pixel blocks having the SAD difference values falling within a predetermined allowable range. In response to the counted number being greater than or equal to a threshold value, the processor 120 may finally determine the previous motion vector which was referred to in order to determine the local search area as the motion vector of the current block, and, in response to the counted number being less than the threshold value, may finally determine the determined motion vector of the current block as the motion vector of the current block.

As described in the above-described example, it may be assumed that, when the determined motion vector of the current block is (2, 5) and the previous motion vector referred to in order to determine the local search area is (0, 5), the allowable range of the SAD difference value is set to 20 and the threshold value is set to 5. In this case, the processor 120 may count the number of reference pixel blocks having an SAD difference value less than 20 from among the whole reference pixel blocks included in the local search area, and, in response to the counted number being greater than or equal to 5, the processor 120 may finally determine (0, 5) as the motion vector of the current block, and, in response to the counted number being less than 5, may finally determine (2, 5) as the motion vector of the current block.

According to another example embodiment, the processor 120 may determine SAD difference values for the plurality of reference pixel blocks by comparing the SAD values between the plurality of reference pixel blocks included in the local search area and the current block, and the minimum SAD value. Accordingly, the processor 120 may determine a sum of the SAD difference values falling within a predetermined allowable range. In response to the sum being greater than or equal to a threshold value, the processor 120 may finally determine the previous motion vector which was referred to in order to determine the local search area as the motion vector of the current block, and, in response to the sum being less than the threshold value, may finally determine the determined motion vector of the current block as the motion vector of the current block.

As described in the above-described example, it may be assumed that, when the determined motion vector of the current block is (2, 5) and the previous motion vector referred to in order to determine the local search area is (0, 5), the allowable range of the SAD difference value is set to 10 and the threshold value is set to 40. In this case, the processor 120 may determine the sum of the SAD difference values of the reference pixel blocks having the SAD difference values which are less than 10 from among the whole reference pixel blocks included in the local search area. For example, in response to there being five reference pixel blocks having the SAD difference values less than 10, and the respective SAD difference values being 5, 6, 7, 5, and 9, the processor 120 may determine 32 by adding these values. Since 32 is less than the threshold value of 40, the processor may finally determine (2, 5) as the motion vector of the current block. In another example, in response to there being ten reference pixel blocks having the SAD difference values less than 10, and the respective SAD difference values being 5, 5, 5, 5, 6, 6, 6, 6, 6, and 8, the processor 120 may determine 58 by adding these values. Since 58 is greater than the threshold value of 40, the processor 120 may finally determine (0, 5) as the motion vector of the current block.

As described above, in response to there being many candidates similar to the determined motion vector based on the SAD values between the plurality of reference pixel blocks included in the local search area and the current block, the processor 120 may not trust the determined motion vector and finally determine the previously determined motion vector (motion vector referred to in order to determine the local search area) as the final motion vector, so that deterioration of image quality which is caused by not finding a unique motion vector in SAD-based motion vector estimation can be prevented.

The processor 120 may up-convert the frame rate using the motion vector finally determined as described above.

In addition, in response to information on the motion vector of the image data being received with the image data through the image receiver 130, the processor 120 may not perform separate motion vector estimation as described above and may up-convert the frame rate using the received motion vector.

In the above-described example, in displaying the image data received through the image receiver 130, the processor 120 up-converts the frame rate. However, this should not be considered as limiting. For example, the above-described operation of the processor 120 may be applied when an image is coded or compressed. For example, when photographing a moving image through the image sensor 150, the processor 120 may code or compress the photographed moving image data according to various image standards such as H.264, etc. In this case, the processor 120 may determine and finally determine the motion vectors of the pixel blocks included in the image frames constituting the moving image in the above-described method, and code or compress the moving image data using the finally determined motion vector.

Figure 3:
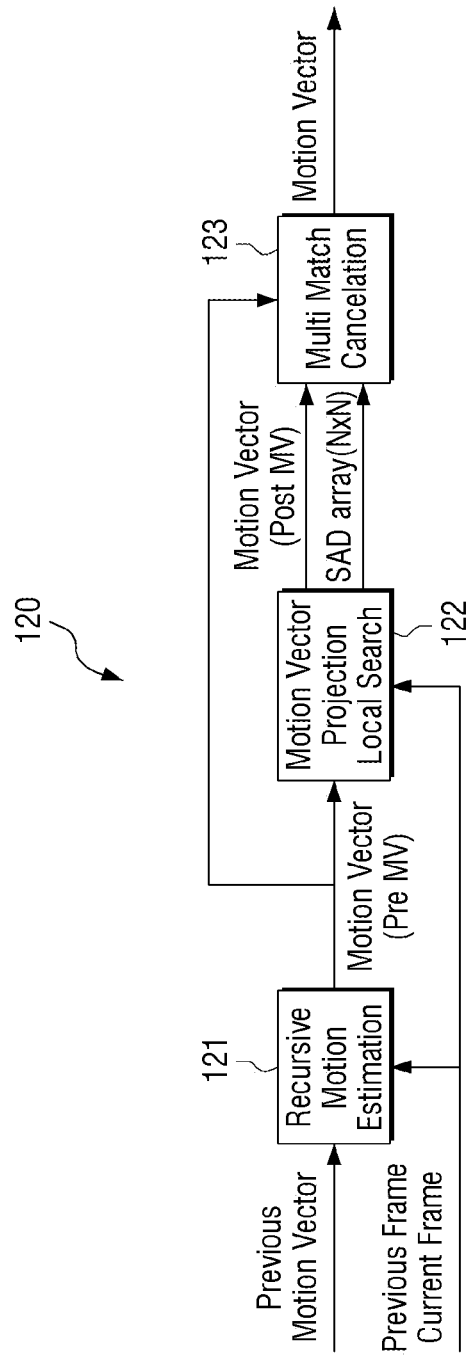
FIG. 3 is a diagram illustrating an example motion vector estimation method of a motion vector estimation apparatus according to an example embodiment.

FIG. 3 is a diagram illustrating an example motion vector estimation method of a motion vector estimation apparatus according to an example embodiment. Specifically, FIG. 3 illustrates an example configuration of the processor 120 of the motion vector estimation apparatus 100, 100' according to functions. Referring to FIG. 3, the processor 120 may include a recursive motion estimation module 121, a motion vector projection local search module 122, and a multi match cancelation module 123.

The recursive motion estimation module 121 estimates a motion vector using motion vectors of a current frame, a previous frame, and a previous block. In this case, the previous block may include not only a pixel block (macro block) which has a motion vector already determined in the current frame, but also a pixel block (macro block) included in the previous frame.

Specifically, the recursive motion estimation module 121 may determine one of the motion vectors of the previous block in the current frame or the previous blocks in the previous frame as an optimal motion vector. For example, the recursive motion estimation module 121 may determine, as the optimal motion vector, one of the motion vector of the pixel block which has the motion vector already determined from among neighboring pixel blocks of the current block, or the motion vectors of neighboring pixel blocks of a pixel block corresponding to the current block in the previous frame.

Specifically, the recursive motion estimation module 121 may determine SAD values between the current block and the previous blocks, and determine a motion vector of a previous block having a minimum SAD value from among the determined SAD values as the optimal motion vector (Pre MV). However, the example of determining the optimal motion vector from among the motion vectors of the previous blocks is not limited to this.

The optimal motion vector (Pre MV) determined as described above is provided to the motion vector projection local search module 122 and the multi match cancelation module 123.

The motion vector projection local search module 122 may receive the optimal motion vector (Pre MV) from the recursive motion estimation module 121, set a local search area in the next frame, and perform the local search. Specifically, the motion vector projection local search module 122 may apply the optimal motion vector to the current block and set the local search area larger than the current block in the next frame.

Accordingly, the motion vector projection local search module 122 may set pixel blocks having the same size as that of the current block in the local search area, and determine SAD values by comparing the pixel block at every location and the current block while sliding from left to right and from top to bottom on the pixel line basis. When the pixel block at each location is referred to as a reference pixel block, the motion vector projection local search module 122 may determine the SAD values between the plurality of reference pixel blocks included in the local search area and the current block as an SAD array. Accordingly, the motion vector projection local search module 122 may determine a minimum SAD value in the SAD array, and determine a motion vector (Post MV) of the current block by comparing the location of the reference pixel block having the minimum SAD value and the location of the current block. However, this is merely an example embodiment, and the local search method of the motion vector projection local search module 122 is not limited to this.

The motion vector projection local search module 122 provides the determined SAD array and the motion vector (Post MV) of the current block to the multi match cancelation module 123.

The multi match cancelation module 123 may determine validity of the motion vector (Post MV) of the current block using the SAD array and the motion vector (Post MV) of the current block which are received from the motion vector projection local search module 122, and the optimal motion vector (Pre MV) which is received from the recursive motion estimation module 121, and finally determine the motion vector of the current block according to the validity.

Specifically, the multi match cancelation module 123 may determine SAD difference values for the plurality of reference pixel blocks by comparing the SAD values of the SAD array and the minimum SAD value, and count the number of reference pixel blocks having the SAD difference values falling within a predetermined allowable range. Accordingly, in response to the counted number being greater than or equal to a threshold value, the multi match cancelation module 123 may determine that the reliability of the motion vector (Post MV) of the current block is low, and finally determine the optimal motion vector (Pre MV) as the motion vector of the current block. In response to the counted number being less than the threshold value, the multi match cancelation module 123 may determine that the reliability of the motion vector (Post MV) of the current block is high and finally determine the motion vector (Post MV) of the current block as the motion vector of the current block.

According to another example embodiment, the multi match cancelation module 123 may determine SAD difference values for the plurality of reference pixel blocks by comparing the SAD values of the SAD array and the minimum SAD value, and determine a sum of the SAD difference values falling within a predetermined allowable range. Accordingly, in response to the sum being greater than or equal to a threshold value, the multi match cancelation module 123 may determine that the reliability of the motion vector (Post MV) of the current block is low, and finally determine the optimal motion vector (Pre MV) as the motion vector of the current block. In response to the sum being less than the threshold value, the multi match cancelation module 123 may determine that the reliability of the motion vector (Post MV) of the current block is high and finally determine the motion vector (Post MV) of the current block as the motion vector of the current block.

According to another example embodiment, in the above-described determination process of the multi match cancelation module 123, the allowable range and the threshold value may vary in association with the standard deviation of pixel values in the current block. For example, in response to the standard deviation of the current block being high, the allowable range and the threshold value may increase, and, in response to the standard deviation of the current block being low, the allowable range and the threshold value may decrease. This is to perform an optimal operation according to the complexity of the current block since the standard deviation of the current block indicates the complexity of pixel values of the current block.

The modules 121, 122, and 123 illustrated in FIG. 3 may be stored in the storage 110 in the form of a software module and the processor 120 may read out the models from the storage 110 to perform the functions of the modules. However, this should not be considered as limiting, and, according to an example embodiment, the modules 121, 122, and 123 may be implemented in the form of hardware of a System on Chip (SoC) by combining and integrating a Register-Transfer Logic (RTL) or a processor.

Hereinafter, the operation of the processor 120 according to various example embodiments will be explained in detail with reference to FIGS. 4 and 5.

Figure 4:
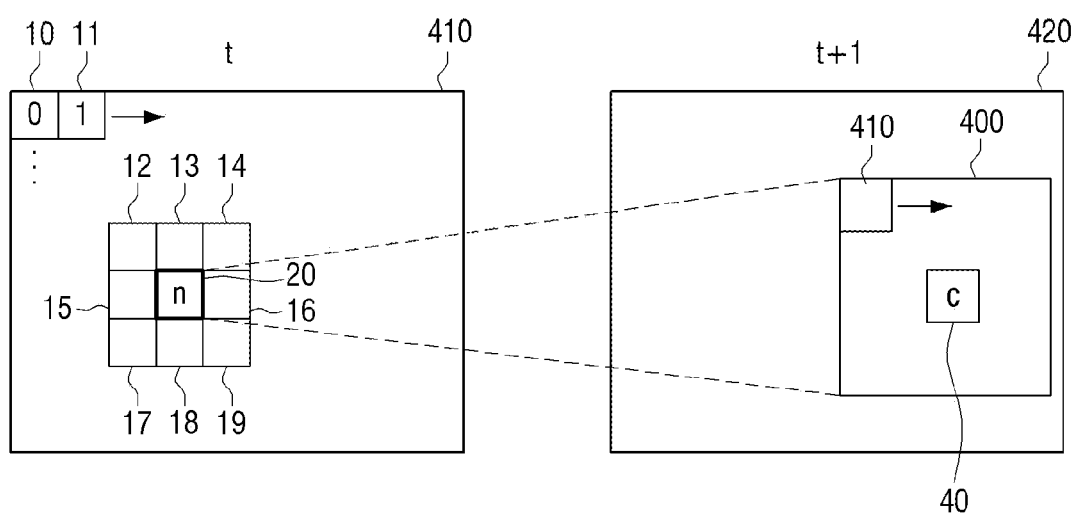
FIG. 4 is a diagram illustrating an example of setting a local search area and determining SAD values according to an example embodiment.

FIG. 4 is a diagram illustrating an example of setting a local search area and determining SAD values according to an example embodiment. Specifically, FIG. 4 illustrates a current frame 410 (t) and a next frame 420 (t+1). Referring to FIG. 4, the processor 120 divides the current frame 410 into a plurality of pixel blocks (macro blocks) and determines motion vectors of the blocks. In this case, the processor 120 may determine the motion vectors from left to right in order of pixel block 0 10, pixel block 1 11, and so on, and from top to bottom. However, this should not be considered as limiting.

In FIG. 4, n pixel block 20 indicates a current block. Accordingly, the processor 120 may determine the local search area by referring to motion vectors of neighboring pixel blocks of the current block 20 and motion vectors of neighboring pixel blocks of a pixel block (not shown) corresponding to the current block 20 in a previous frame (not shown).

Since the motion vectors are determined from left to right and from top to bottom in the example of FIG. 4 as described above, the processor 120 may use the motion vectors of pixel blocks 12-15 in the current frame. However, the motion vectors of pixel blocks 16-19 in the current frame are not still determined. In the case of the previous frame (not shown), since the motion vectors of all of the pixel blocks have been determined, the processor 120 may acquire the motion vectors corresponding to the pixel blocks 16-19 of the current frame 410 from the previous frame (not shown), and use the same. As described above, the processor 120 may determine the local search area by referring to the motion vectors of the neighboring pixel blocks 12, 13, 14, and 15 of the current block and the motion vectors of the neighboring pixel blocks (not shown) of the pixel block corresponding to the current block 20 in the previous frame (not shown).

Specifically, the processor 120 may determine an optimal motion vector from among motion vectors of eight previous blocks as described above, and set the local search area in the next frame 420 by applying the determined optimal motion vector to the current block.

As illustrated in FIG. 4, the processor 120 may set the local search area 400 in the next frame 420 by applying the optimal motion vector to the current block 20. Herein, C 40 is the center of the local search area and is a result of applying the optimal motion vector to the location of the current block 20.

The processor 120 may set a pixel block 410 of a size corresponding to the current block 20 in the local search area, and determine SAD values between the pixel blocks at respective locations and the current block 20 while sliding from left to right and from top to bottom on the pixel line basis. In this case, the pixel blocks at the respective locations are a plurality of reference pixel blocks in the local search area. Accordingly, the processor 120 may determine a minimum SAD value from among the SAD values between the plurality of reference pixel blocks and the current block, and determine a motion vector of the current block 20 by comparing the location of the pixel block having the minimum SAD value in the local search area and the location of the current block 20.

Thereafter, the processor 120 may determine SAD difference values for the plurality of reference pixel blocks by comparing the SAD values determined for the plurality of reference pixel blocks and the minimum SAD value, and counts the number of reference pixel blocks having the SAD difference values falling within a predetermined allowable range. Accordingly, in response to the counted number being greater than or equal to a threshold value, the processor 120 may finally determine the previous motion vector which was referred to in order to determine the local search area, that is, the above-described optimal motion vector, as the motion vector of the current block, and, in response to the counted number being less than the threshold value, may finally determine the determined current motion vector as the motion vector of the current block.

According to another example embodiment, the processor 120 may determine SAD difference values for the plurality of reference pixel blocks by comparing the SAD values determined for the plurality of reference pixel blocks and the minimum SAD value, and determine a sum of the SAD difference values of the reference pixel blocks having the SAD difference values falling within a predetermined allowable range. Accordingly, in response to the sum being greater than or equal to a threshold value, the processor 120 may finally determine the previous motion vector which was referred to in order to determine the local search area, that is, the above-described optimal motion vector, as the motion vector of the current block, and, in response to the sum being less than the threshold value, may finally determine the determined current motion vector as the motion vector of the current block.

In FIG. 4, the motion vectors of the eight pixel blocks surrounding the current block are referred to from among the neighboring pixel blocks of the current block. However, this should not be considered as limiting. The motion vectors of other neighboring pixel blocks of the current block may be referred to or a different number of neighboring pixel blocks, such as four or twelve pixel blocks, rather than eight pixel blocks, may be referred to.

Figure 5A:
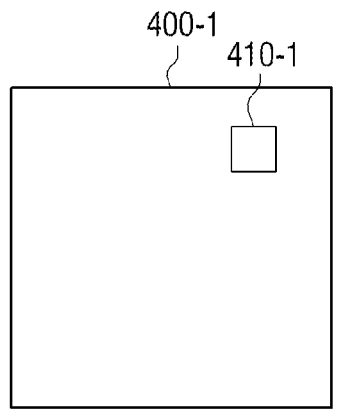
FIGS. 5A and 5B are diagrams illustrating an example of distribution of SAD values in a local search area.
Figure 5B:
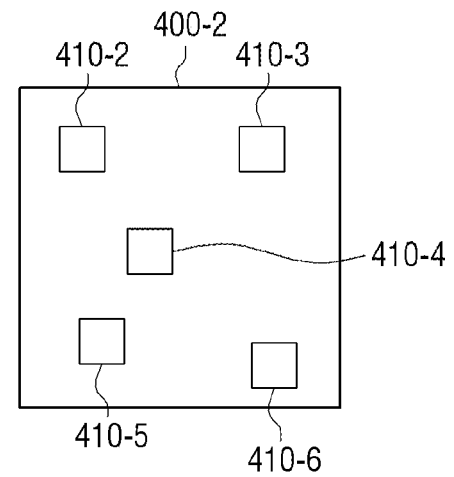

FIGS. 5A and 5B are diagrams illustrating example distribution of SAD values in a local search area according to an example embodiment. Specifically, FIG. 5A illustrates a case in which there exists a single reference pixel block 410-1 having a minimum SAD value in a local search area 400-1 and there is no reference pixel block having a SAD difference value falling within a predetermined allowable range. In this case, the processor 120 may determine that the reliability of the determined motion vector of the current block is high and finally determine the determined motion vector as the motion vector the current block.

FIG. 5B illustrates a case in which there is a pixel block 410-3 having a minimum SAD value and there are a plurality of reference pixel blocks 410-2, 410-4, 410-5, and 410-6 similar to the pixel block 410-3, that is, having SAD difference values falling within an allowable range, in a local search area 400-2.

In this case, according to an example embodiment, the processor 120 may count the number of reference pixel blocks 410-2, 410-4, 410-5, and 410-6 having the SAD difference values falling within the allowable range, and in response to the counted number being greater than or equal to a threshold value, the processor 120 may determine that the reliability of the determined motion vector of the current block is low and finally determine the previous motion vector, that is, the above-described optimal motion vector, as the motion vector of the current block, and, in response to the counted number being less than the threshold value, the processor 120 may determine that the reliability of the determined motion vector of the current block is high and finally determine the determined motion vector as the motion vector of the current block.

According to another example embodiment, the processor 120 may determine a sum of the SAD difference values of the reference pixel blocks 410-2, 410-4, 410-5, and 410-6 having the SAD difference values falling within the allowable range. In response to the sum being greater than or equal to a threshold value, the processor 120 may determine that the reliability of the determined motion vector of the current block is low and finally determine the previous motion vector, that is, the above-described optimal motion vector, as the motion vector of the current block, and, in response to the sum being less than the threshold value, the processor 120 may determine that the reliability of the determined motion vector of the current block is high and finally determine the determined motion vector as the motion vector of the current block.

In the example of FIG. 5B, a pixel block 410-3 having a minimum SAD value is excluded in counting the number of reference pixel blocks having the SAD difference values falling within the allowable range or determining the sum of the SAD difference values. However, this should not be considered as limiting. According to an example embodiment, the pixel block 410-3 may be included.

In the above-described example embodiments, the motion vector estimation apparatus 100, 100' is a display apparatus or a photographing apparatus. However, this should not be considered as limiting. For example, the storage 110 and the processor 120 of the motion vector estimation apparatus 100 shown in FIG. 1 may be included in a frame rate converter (FRC) of a display apparatus or a codec chip of a photographing apparatus. In this case, the display apparatus or the photographing apparatus may include a separate main processor for controlling overall operations, and the motion vector estimation apparatus 100 may be included in the FRC or the codec chip in the form of a SoC.

Figure 6:
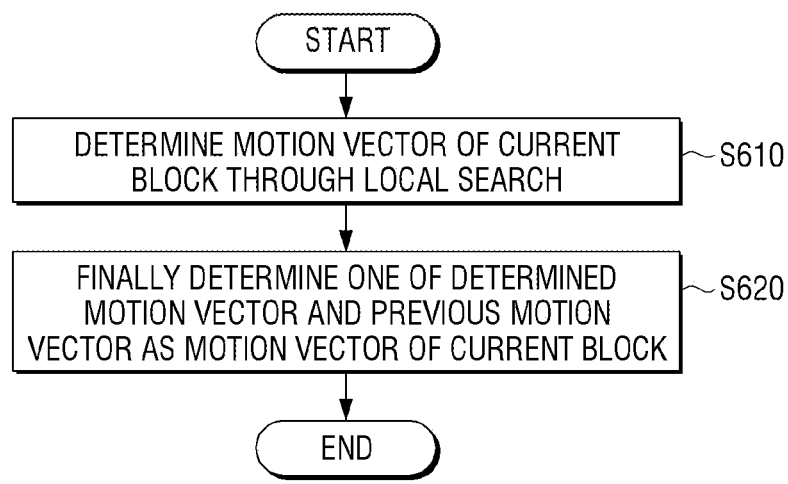
FIG. 6 is a flowchart illustrating an example motion vector estimation method according to an example embodiment.

FIG. 6 is a flowchart illustrating an example motion vector estimation method according to an example embodiment. Referring to FIG. 6, the motion vector estimation apparatus 100, 100' may determine a motion vector of a current block through a local search (S610).

Specifically, the motion vector estimation apparatus 100, 100' may determine the motion vector of the current block by setting, in another frame, a local search area for searching a plurality of reference pixel blocks corresponding to the single current block from among pixel blocks included in one frame.

For example, the motion vector estimation apparatus 100, 100' may determine the local search area by referring to neighboring pixel blocks of the current block in one frame or neighboring pixel blocks of a pixel block corresponding to the current block in a previous frame, and determine SAD values between the plurality of reference pixel blocks included in the local search area and the current block. Accordingly, the motion vector estimation apparatus 100, 100' may determine a minimum SAD value from among the determined SAD values, and determine the motion vector of the current block by comparing the pixel block having the minimum SAD value and the current block.

In addition, the motion vector estimation apparatus 100, 100' may finally determine one of the determined motion vector and the previous motion vector which was referred to in order to determine the local search area as the motion vector of the current block, based on the SAD values of the reference pixel blocks included in the local search area (S620).

Specifically, the motion vector estimation apparatus 100, 100' may determine SAD difference values for the plurality of reference pixel blocks by comparing the determined SAD values and the minimum SAD value, and count the number of reference pixel blocks having the SAD difference values falling within a predetermined allowable range. Accordingly, in response to the counted number being greater than or equal to a threshold value, the motion vector estimation apparatus 100, 100' may finally determine the previous motion vector referred to in order to determine the local search area as the motion vector of the current block, and, in response to the counted number being less than the threshold value, finally determine the determined motion vector as the motion vector of the current block.

According to another example embodiment, the motion vector estimation apparatus 100, 100' may determine SAD difference values for the plurality of reference pixel blocks by comparing the determined SAD values and the minimum SAD value, and determine a sum of the SAD difference values falling within a predetermined allowable range. Accordingly, in response to the sum being greater than or equal to a threshold value, the motion vector estimation apparatus 100, 100' may finally determine the previous motion vector referred to in order to determine the local search area as the motion vector of the current block, and, in response to the sum being less than the threshold value, finally determine the determined motion vector as the motion vector of the current block.

In this case, the motion vector estimation apparatus 100, 100' may set at least one of the allowable range and the threshold value variably according to the standard deviation of pixel values in the current block.

Figure 7:
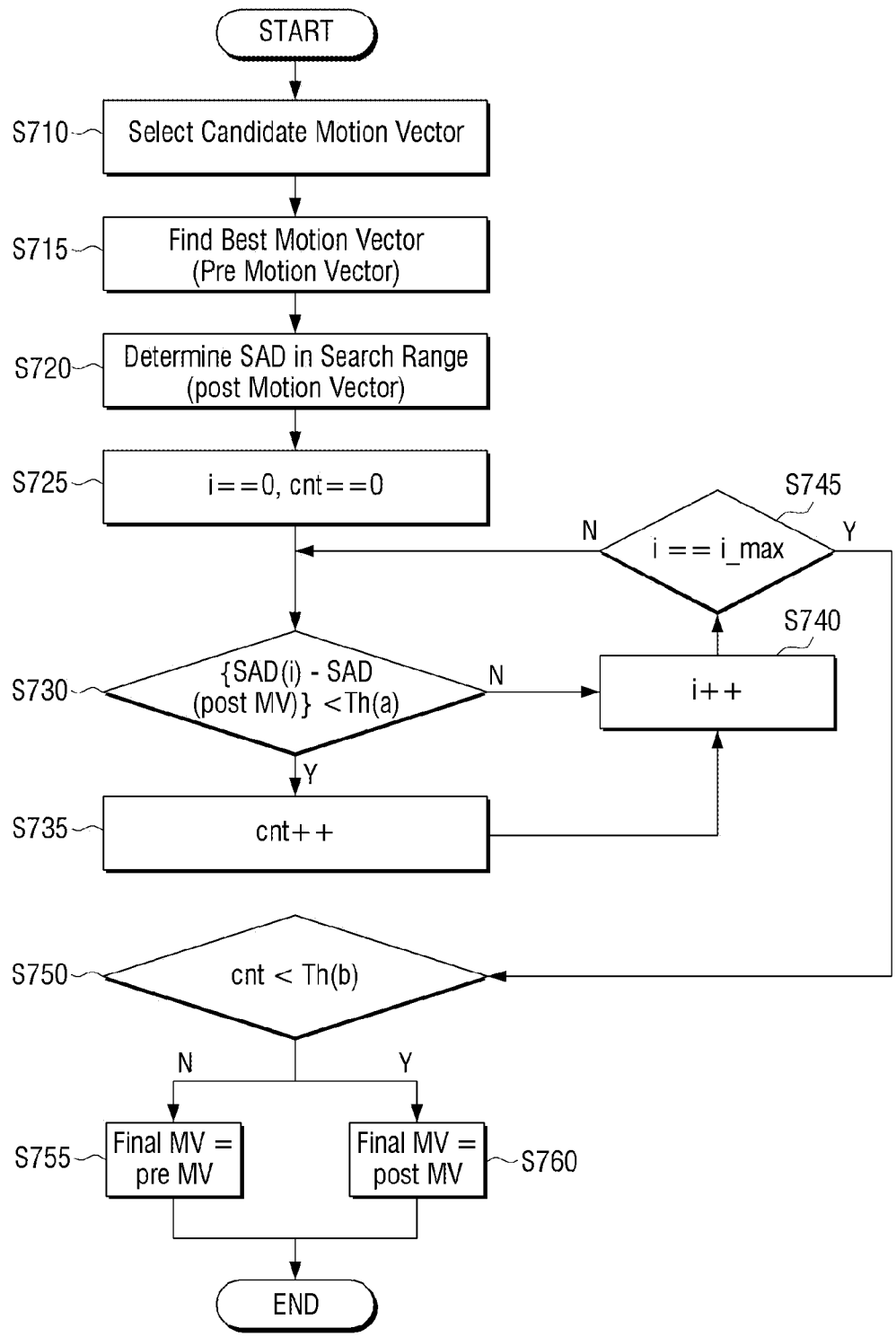
FIG. 7 is a flowchart illustrating an example motion vector estimation algorithm according to another example embodiment.

FIG. 7 is a sequence diagram illustrating an example motion vector estimation algorithm according to an example embodiment. Referring to FIG. 7, the motion vector estimation apparatus 100, 100' selects candidate motion vectors from among the motion vectors of a current frame or a previous block (that is, a block having a motion vector already determined) included in a previous frame (S710). For example, the motion vector estimation apparatus 100, 100' may select motion vectors of neighboring blocks surrounding a current block as the candidate motion vectors, but is not limited to this.

The motion vector estimation apparatus 100, 100' determines an optimal motion vector from among the selected candidate motion vectors (S715). For example, the motion vector estimation apparatus 100, 100' may determine SAD values between the current block and previous blocks having the selected candidate motion vectors, and determine a motion vector of a previous block having a minimum SAD value as the optimal motion vector (Pre Motion Vector). However, this should not be considered as limiting.

Accordingly, the motion vector estimation apparatus 100, 100' may set a local search area in the next frame and determine an SAD array by comparing the SAD values between the plurality of reference pixel blocks included in the local search area and the current block. Accordingly, the motion vector estimation apparatus 100, 100' may determine a motion vector of the current block (Post Motion Vector) by comparing the reference pixel block having the minimum SAD value in the SAD array and the current block (S720).

Thereafter, the motion vector estimation apparatus 100, 100' compares the SAD values of the plurality of reference pixel blocks included in the local search area and the minim SAD value (that is, the SAD value of the reference pixel which was used to determine the post motion vector), and counts the number of blocks having SAD difference values falling within an allowable range (Th(a)). In this case, the motion vector estimation apparatus 100, 100' may perform the same operation with respect to all of the reference pixel blocks included in the local search area (S725-S745).

When it is determined whether the SAD difference values for all of the reference pixel blocks included in the local search area fall within the allowable range (S745-Y), the motion vector estimation apparatus 100, 100' determines whether the counted number is less than a threshold value or not (S750).

Accordingly, in response to the counted number (Cnt) being less than the threshold value (Th(b)) (S750-Y), the motion vector estimation apparatus 100, 100' may determine the motion vector (Post MV) of the current block determined in step S720 as a final motion vector (S760), and, in response to the counted number (Cnt) being greater than or equal to the threshold value (Th(b)) (S750-N), the motion vector estimation apparatus 100, 100' may determine the optimal motion vector (Pre MV) determined in step S715 as the final motion vector (S755).

According to various example embodiments described above, deterioration of image quality which is caused by not finding a unique motion vector in SAD-based motion estimation can be prevented.

Specifically, when a related-art SAD-based motion vector estimation method is applied to an image including a pattern area or a flat background, motion vectors are not aligned. This problem may cause serious deterioration of an object included in the image particularly in the case of frame rate up conversion. However, according to various example embodiments described above, a previously found motion vector is maintained even in a pattern area or a flat background, and thus deterioration can be prevented.

Figure 8A:
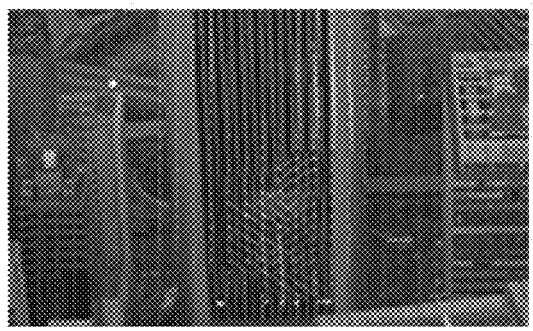
FIGS. 8A and 8B are diagrams illustrating an example result of applying a related-art SAD-based motion vector estimation method and a result of applying a motion vector estimation method according to various example embodiments.
Figure 8B:
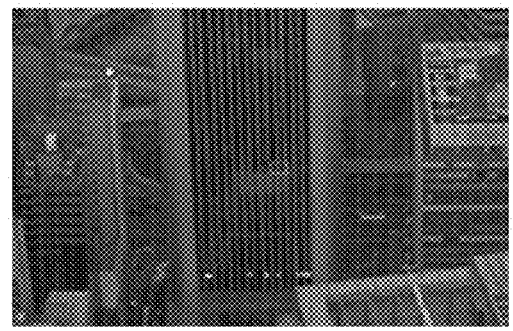

FIGS. 8A and 8B are diagrams illustrating an example result of applying a related-art SAD-based motion vector estimation method and a result of applying the motion vector estimation method according to various example embodiments.

Specifically, when the related-art SAD-based motion vector estimation method is applied to an image including a pattern area, image quality deteriorates in the pattern area as shown in FIG. 8A. However, when the motion vector estimation method according to various example embodiments is applied, the image quality does not deteriorate in the pattern area as shown in FIG. 8B.

The operation of the processor of the motion vector estimation apparatus according to various example embodiments, or the motion vector estimation methods of the motion vector estimation apparatus may be generated as software and may be mounted in the motion vector estimation apparatus.

For example, a non-transitory computer readable medium which stores a program for performing a motion vector estimation method may be installed. The motion vector estimation method may include: determining a motion vector of a current block by setting, in another frame, a local search area for searching a plurality of reference pixel blocks corresponding to the current block which is one of pixel blocks in a single frame; and finally determining one of the determined motion vector and a previous motion vector which is referred to in order to determine the local search area as a motion vector of the current block, based on SAD values of the reference pixel blocks included in the local search area.

The non-transitory computer readable medium refers to a medium that stores data, and is readable by an apparatus. Specifically, the above-described middleware or programs may be stored in the non-transitory computer readable medium such as a compact disc (CD), a digital versatile disk (DVD), a hard disk, a Blu-ray disk, a universal serial bus (USB), a memory card, a ROM or etc., and may be provided.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description but by the appended claims, and all differences within the scope will be construed as being included in the disclosure.

What is claimed is:

1. A motion vector estimation method comprising:
    identifying a motion vector of one pixel block from among neighboring pixel blocks of a current block in a single frame and neighboring pixel blocks of a pixel block corresponding to the current block in a previous frame, as a first motion vector;
    identifying a local search area, including a plurality of reference pixel blocks, corresponding to the current block based on the first motion vector;
    obtaining a second motion vector of the current block by searching the plurality of the reference pixel blocks; and
    finally identifying one of the first motion vector and the second motion vector, as a motion vector of the current block, based on a sum of absolution difference (SAD) values between the plurality of the reference pixel blocks and the current block;
    wherein the obtaining comprises: obtaining the SAD values; identifying a minimum SAD value from among the obtained SAD values; and identifying the motion vector of the current block by comparing a pixel block having the determined minimum SAD value and the current block; and
    wherein the finally identifying comprises: obtaining SAD difference values for the plurality of the reference pixel blocks by comparing the obtained SAD values and the minimum SAD value; obtaining a sum of the SAD difference values falling within a predetermined allowable range; and based on that the sum being greater than or equal to a threshold value, finally identifying the second motion vector as the motion vector of the current block, and/or, based on that the sum being less than the threshold value, finally identifying the first motion vector as the motion vector of the current block.

2. The motion vector estimation method of claim 1, wherein the finally identifying comprises:
    identifying a number of reference pixel blocks having the SAD difference values falling within a predetermined allowable range; and
    based on that the identified number being greater than or equal to a threshold value, finally identifying the second motion vector as the motion vector of the current block, and/or, based on that the identified number being less than the threshold value, finally identifying the first motion vector as the motion vector of the current block.

3. The motion vector estimation method of claim 2, wherein at least one of the allowable range and the threshold value is set variably based on a standard deviation of pixel values in the current block.

4. A motion vector estimation apparatus comprising:
    a storage configured to store a plurality of frames; and
    a processor configured to:
    identify a motion vector of one pixel block from among neighboring pixel blocks of a current block in a single frame and neighboring pixel blocks of a pixel block corresponding to the current block in a previous frame, as a first motion vector,
    identify a local search area, including a plurality of reference pixel blocks, corresponding to the current block based on the first motion vector,
    obtain a second motion vector of the current block by searching the plurality of the pixel blocks, and
    finally identify one of the first motion vector and the second motion vector as a motion vector of the current block, based on a sum of absolution difference (SAD) values between the plurality of the reference pixel blocks and the current block;
    wherein the processor is further configured to: obtain the SAD values; identify a minimum SAD value from among the obtained SAD values; and identify the motion vector of the current block by comparing a pixel block having the determined minimum SAD value and the current block; and wherein the processor is further configured to: obtain SAD difference values for the plurality of the reference pixel blocks by comparing the obtained SAD values and the minimum SAD value, and obtain a sum of the SAD difference values falling within a predetermined allowable range; and based on that the sum being greater than or equal to a threshold value, finally identify the second motion vector as the motion vector of the current block, and/or, based on that the sum being less than the threshold value, finally identify the first motion vector as the motion vector of the current block.

5. The motion vector estimation apparatus of claim 4, wherein the processor is configured to:
  identify a number of reference pixel blocks having the SAD difference values falling within a predetermined allowable range; and
  based on that the identified number being greater than or equal to a threshold value, finally identify the second motion vector as the motion vector of the current block, and/or, based on that the identified number being less than the threshold value, finally identify the first motion vector as the motion vector of the current block.

6. The motion vector estimation apparatus of claim 5, wherein the processor is configured to set at least one of the allowable range and the threshold value variably based on a standard deviation of pixel values in the current block.

7. A non-transitory computer-readable recording medium which comprises a program for executing a motion vector estimation method, the motion vector estimation method comprising:
  identifying a motion vector of one pixel block from among neighboring pixel blocks of a current block in a single frame and neighboring pixel blocks of a pixel block corresponding to the current block in a previous frame, as a first motion vector;
  identifying a local search area, including a plurality of reference pixel blocks, corresponding to the current block based on the first motion vector;
  obtaining a second motion vector of the current block by searching the plurality of the reference pixel blocks; and
  finally identifying one of the first motion vector and the second motion vector as a motion vector of the current block, based on a sum of absolution difference (SAD) values between the plurality of the reference pixel blocks and the current block;
  wherein the obtaining comprises: obtaining the SAD values; identifying a minimum SAD value from among the obtained SAD values; and identifying the motion vector of the current block by comparing a pixel block having the determined minimum SAD value and the current block; and
  wherein the finally identifying comprises: obtaining SAD difference values for the plurality of the reference pixel blocks by comparing the obtained SAD values and the minimum SAD value; obtaining a sum of the SAD difference values falling within a predetermined allowable range; and based on that the sum being greater than or equal to a threshold value, finally identifying the second motion vector as the motion vector of the current block, and/or, based on that the sum being less than the threshold value, finally identifying the first motion vector as the motion vector of the current block.

* * * * *